(12) United States Patent
Van Gundy et al.

(10) Patent No.: US 8,059,795 B2
(45) Date of Patent: Nov. 15, 2011

(54) SYSTEMS AND METHODS FOR PROVIDING VOICEMAIL FEATURES IN A VOIP SYSTEM

(75) Inventors: Scott A. Van Gundy, Los Gatos, CA (US); Sunita Vontel, San Jose, CA (US); John Vuong, San Jose, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 705 days.

(21) Appl. No.: 12/181,255

(22) Filed: Jul. 28, 2008

(65) Prior Publication Data
US 2010/0020947 A1   Jan. 28, 2010

(51) Int. Cl.
*H04M 1/64* (2006.01)
*H04L 5/22* (2006.01)

(52) U.S. Cl. ............... 379/88.17; 370/462; 370/468; 379/88.18; 379/142.07; 379/221.09; 379/221.12

(58) Field of Classification Search .............. 379/88.17, 379/88.18, 142.07, 221.09, 221.12; 370/462, 370/468
See application file for complete search history.

(56) References Cited

U.S. PATENT DOCUMENTS

| | | | |
|---|---|---|---|
| 6,535,521 B1 * | 3/2003 | Barghouti et al. | 370/462 |
| 6,940,954 B1 * | 9/2005 | Toebes | 379/88.17 |
| 6,996,059 B1 | 2/2006 | Tonogai | |
| 7,003,091 B1 | 2/2006 | Burns et al. | |
| 7,167,486 B2 | 1/2007 | Cornelius et al. | |
| 7,315,614 B2 * | 1/2008 | Bedingfield et al. | 379/142.07 |
| 7,330,538 B2 * | 2/2008 | Dunsmuir | 379/88.18 |
| 7,379,540 B1 | 5/2008 | Van Gundy | |
| 7,386,114 B1 | 6/2008 | Robesky | |
| 7,403,601 B2 * | 7/2008 | Dunsmuir | 379/88.18 |
| 2005/0226218 A1 | 10/2005 | Berkowitz et al. | |
| 2006/0233340 A1 | 10/2006 | Tovino et al. | |
| 2007/0064911 A1 * | 3/2007 | Bedingfield et al. | 379/221.09 |
| 2007/0171098 A1 | 7/2007 | Basart et al. | |
| 2008/0010163 A1 | 1/2008 | Kish | |
| 2008/0095335 A1 | 4/2008 | Bedinfield et al. | |
| 2009/0168988 A1 * | 7/2009 | Bruening et al. | 379/221.12 |
| 2010/0020947 A1 * | 1/2010 | Van Gundy et al. | 379/88.17 |

OTHER PUBLICATIONS

The Voice Wizard Brochure [retrieved on Jan. 2, 2009] Retrieved from VoiceGate Corporation website, URL:http://www.voicegatecorp.com/wizard.htm.
International Search Report for PCT/US2009/051558 mailed on Sep. 17, 2009; 2 pages.
Written Opinion for PCT/US2009/051558 mailed on Sep. 17, 2009; 9 pages.

* cited by examiner

*Primary Examiner* — Gerald Gauthier
(74) *Attorney, Agent, or Firm* — Kilpatrick Townsend & Stockton LLP

(57) ABSTRACT

A distributed VoIP system includes a first switch coupled to a network and configured to provide voicemail features to a first group of one or more users. The system also includes a voicemail server coupled to the network. The voicemail server is configured to provide voicemail features to a second group of one or more users. The first switch is configured to store voicemail data associated with only the first group, and the voicemail server is configured to store voicemail data associated with both the first and second groups.

38 Claims, 5 Drawing Sheets

US 8,059,795 B2

SYSTEMS AND METHODS FOR PROVIDING VOICEMAIL FEATURES IN A VOIP SYSTEM

BACKGROUND OF THE INVENTION

The present invention relates in general to distributed telephony and, more particularly, to systems and methods for providing voicemail features in a distributed Voice-over-Internet Protocol (VoIP) system.

VoIP systems route voice conversations and other telecommunications over the Internet or other packet switched networks. A distributed VoIP system includes a distributed set of switches and servers that provide applications enabled by the integration of computer systems with telephony services. Computer-integrated features rely not only on a server's application platform, but also on the availability of the network that connects the switches and servers.

In a conventional distributed VoIP system data is stored on hard disk drives. The data may include voicemail messages and other data such as mailbox information, recorded names and greetings of users, system prompts, automated attendant menus and prompts, work group greetings and prompts, music on hold files, video files, and recorded conference call files. As examples, voicemail systems often store the spoken name of each user. The recorded name of a user may be played when a message from that user is listened to. Most voicemail systems also include system prompts, which are pre-recorded prompts that are arranged to guide users and/or callers in accessing and using the features of the voicemail system. Some voicemail systems include hundreds of system prompts, each of which may be stored in as many of fifteen or more different languages.

The performance and reliability of a distributed VoIP system can be increased by keeping a portion of the data consistent across all servers. For example, each server in a conventional distributed VoIP system stores the recorded name of each user in the system as well as the system prompts for the entire system. Each server has access to the data and can backup other servers, thus eliminating single points of failure. Performance is increased by locating servers relatively close geographically to users thus reducing network delays.

Because VoIP systems are highly scalable and can provide communication features to large numbers of users, the resources necessary to provide the required performance and reliability are significant. For example, a large company with thousands of employees scattered across many sites would traditionally have one or more switches and servers at each site, and each server would store at least a portion of the data for the entire VoIP system. Even systems with a relatively small number of users usually have hundreds of system prompts in many different languages stored on each server. The upfront costs and ongoing maintenance costs of providing these resources can be prohibitive.

Thus, there is a general need in the art for improved systems and methods for providing voicemail features in a distributed VoIP system.

BRIEF SUMMARY OF THE INVENTION

In accordance with an embodiment of the invention, a distributed VoIP system includes a first switch coupled to a network and configured to provide voicemail features to a first group of one or more users. The system also includes a voicemail server coupled to the network. The voicemail server is configured to provide voicemail features to a second group of one or more users. The first switch is configured to store voicemail data associated with only the first group, and the voicemail server is configured to store voicemail data associated with both the first and second groups.

In one embodiment, the voicemail data includes recorded names.

In another embodiment, the first switch is an integrated switch/voicemail server.

In another embodiment, the system includes a terminal that is coupled to the voicemail server and is configured to display usage of the voicemail features in the distributed VoIP system.

In yet another embodiment, the first switch is configured to store system prompts only in languages associated with the one or more users in the first group, and the second switch is configured to store system prompts in languages available in the distributed VoIP system.

In accordance with another embodiment of the invention, voicemail data is provided to a first user in a distributed VoIP system as follows. A request is received at an integrated switch/voicemail server to provide voicemail data to a first user. If the voicemail is not in memory of the integrated switch/voicemail server, the voicemail data is requested from a voicemail server.

In one embodiment, the switch/voicemail server is associated with a first group of one or more users, and the switch/voicemail server stores the voicemail data associated with only the first group.

In another embodiment, the voicemail server is associated with a second group of one or more users, and the voicemail server stores voicemail data associated with both the first and second groups.

A further understanding of the nature and advantages of the present invention may be realized by reference to the remaining portions of the specification and the drawings.

DETAILED DESCRIPTION OF THE INVENTION

In accordance with embodiments of the present invention, a switch/voicemail server provides voicemail features to users in a distributed VoIP system. The switch/voicemail server also manages or directs the communications of the devices associated with the users. In one embodiment, the switch/voicemail server may be an integrated device with a smaller footprint and less storage than a voicemail server. In some embodiments, the switch/voicemail server does not store the voicemail data for the entire VoIP system, but instead may request voicemail data from a voicemail server. In other embodiments, the switch/voicemail server may transfer requests for voicemail data to a voicemail server. Thus, embodiments of the present invention may reduce system resources and costs compared to conventional distributed VoIP systems. As such, the integrated switch/voicemail server may be advantageously used to provide telephony services to smaller offices or remote sites that are part of a distributed VoIP system. These and other features and advantages of the invention, as well as other embodiments of the invention, are described in more detail below.

Figure 1:
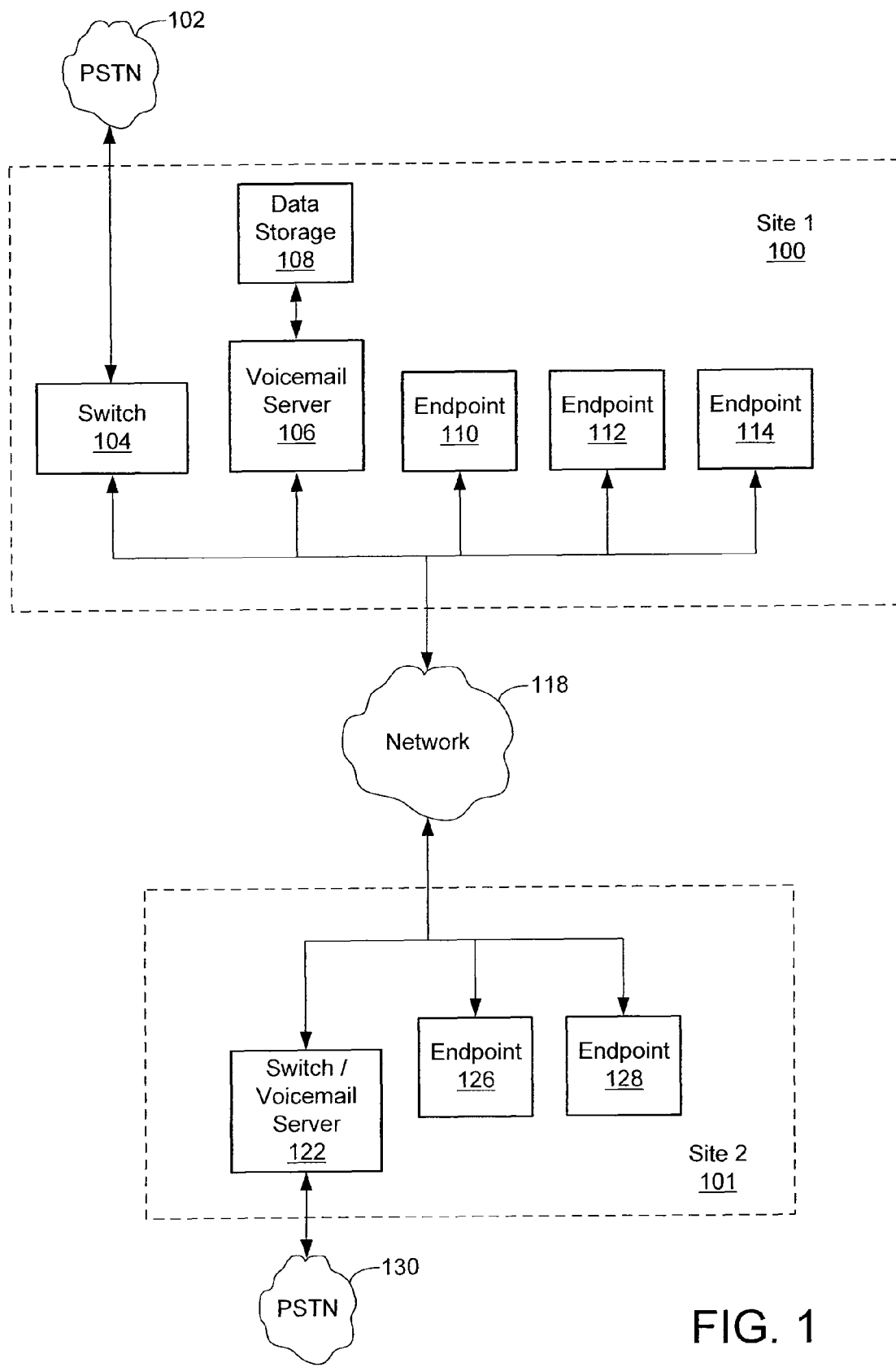
FIG. 1 shows a simplified block diagram of a distributed VoIP system, in accordance with an embodiment of the present invention.

FIG. 1 shows a block diagram of a distributed VoIP system, in accordance with an embodiment of the present invention. It should be understood that the following description is only exemplary, and the scope of the invention is not limited to these specific examples.

The system shown in FIG. 1 includes a set of switches and servers (i.e., switch 104, voicemail server 106, and switch/voicemail server 122) distributed across different sites (i.e., first site 100 and second site 101). As used herein, a site represents a grouping of resources. The sites may be physically distinct from one another, or they may be topology-related groupings that are not in physically distinct locations. While FIG. 1 illustrates two sites, the present invention may apply to any distributed VoIP system with two or more sites.

As shown in FIG. 1, switch 104 may be linked to the public switched telephone network (PSTN) 102. In one embodiment, switch 104 and PSTN 102 may be linked via a trunk line (e.g., a T1 or E1 interface). Switch 104 may act as a gateway for calls between PSTN 102 and endpoints 110, 112, 114.

Switch 104 may also manage or direct the communications of the components that are linked to switch 104, as well as manage the state and connections of these components. In some embodiments, switch 104 may perform the same functions for the components that are linked to switch/voicemail server 122 in the event of a failure of switch/voicemail server 122.

Endpoints 110, 112, 114 and endpoints 126, 128 are communication devices that allow a user to communicate by making or receiving phone calls, voice messages, and/or other types of communications. For example, an endpoint may enable a user to carry on a phone call and may include a user interface to convey data to and receive data from the user. The endpoints may include one or more IP phones, soft phones, analog phones, button boxes, or other communication devices. Although FIG. 1 shows three endpoints linked to switch 104 and two endpoints linked to switch/voicemail server 122, a VoIP system may include more or fewer endpoints linked to each switch. For example, the ShoreGear 220T1 voice switch from ShoreTel, Inc. of Sunnyvale, Calif., can support up to 220 IP endpoints and 4 analog phones.

As shown in FIG. 1, voicemail server 106 may be linked with switch 104 and endpoints 110, 112, 114. In one embodiment, voicemail server 106 may be configured to implement the applications of the VoIP system. As an example, voicemail server 106 may be configured to provide voicemail features to endpoints 110, 112, 114, or those communication devices linked to voicemail server 106. As such, voicemail server 106 may store in local memory voicemail messages and voicemail data for endpoints 110, 112, 114 in accordance with known techniques. Alternatively, the voicemail messages and/or voicemail data may be stored in data storage 108, which may be linked to and accessible by voicemail server 106.

In some embodiments, voicemail server 106 may also be configured as a secondary provider of voicemail features to endpoints 126, 128. As such, voicemail server 106 may store in memory at least a portion of the voicemail data for endpoints 126, 128. Alternatively, at least a portion of the voicemail data for endpoints 126, 128 may be stored in data storage 108. For example, the recorded names of the users associated with endpoints 110, 112, 114 and endpoints 126, 128 may be stored in memory of voicemail server 106 and/or in data storage 108. Additionally, the system prompts, automated attendant menus, work group greetings and prompts, music on hold files, video files, and recorded conference call files for the entire system may be stored in memory of voicemail server 106 and/or in data storage 108. As used herein, automated attendant menus include both automated attendant menus and automated attendant prompts.

Voicemail server 106 typically includes familiar software and hardware components. For example, voicemail server 106 may include an operating system, processor, local memory for storage, I/O devices, and a system bus interconnecting the components. RAM and disk drives are examples of local memory for storage of data and computer programs. Other types of local memory include magnetic storage media, optical storage media, flash memory, networked storage devices, and the like. In some embodiments, voicemail server 106 may include more than one server (e.g. server cluster).

In some embodiments, voicemail server 106 may be linked directly to data storage 108 as shown in FIG. 1. In other embodiments, data storage 108 may be linked to voicemail server 106 via a local network. Data storage 108 may be configured to store and maintain voicemail messages, voicemail data, and other data. Data storage 108 may be any conventional database such as those powered by My SQL, Oracle, Sybase, and the like, or another data source such as an LDAP server.

The components of the VoIP system at first site 100 may be linked indirectly to one or more other groups of components via network 118. For example, as shown in FIG. 1, first site 100 may be linked with second site 101 via network 118. Network 118 may be the Internet or any other packet switched network over which the distributed VoIP system operates.

The group of components at second site 101 may include switch/voicemail server 122 and endpoints 126, 128. Switch/voicemail server 122 may be configured to perform some of the same functions as switch 104. For example, switch/voicemail server 122 may be linked to PSTN 130 and act as a gateway for calls between PSTN 130 and endpoints 126, 128. Switch/voicemail server 122 may also manage or direct communications of the components of the VoIP system that are linked to switch/voicemail server 122, as well as manage the state and connections of these components. In some embodiments, switch/voicemail server 122 may perform the same functions for the components of the VoIP system that are linked to switch 104 in the event of a failure of switch 104.

Switch/voicemail server 122 may also be configured to implement some of the same features as voicemail server 106. For example, switch/voicemail server 122 may be configured to provide voicemail features to endpoints 126, 128, or those communication devices linked to switch/voicemail server 122. As explained more fully below, switch/voicemail server 122 may store in local memory the voicemail messages and voicemail data associated with endpoints 126, 128. Alternatively, the voicemail messages and/or the voicemail data may be stored in data storage. The voicemail data may include recorded names of the users associated with endpoints 126, 128, system prompts in languages associated with the users of endpoints 126, 128, system prompts in languages that are selected by a system administrator, automated attendant menus configured for switch/voicemail server 122, and other data.

Figure 3:
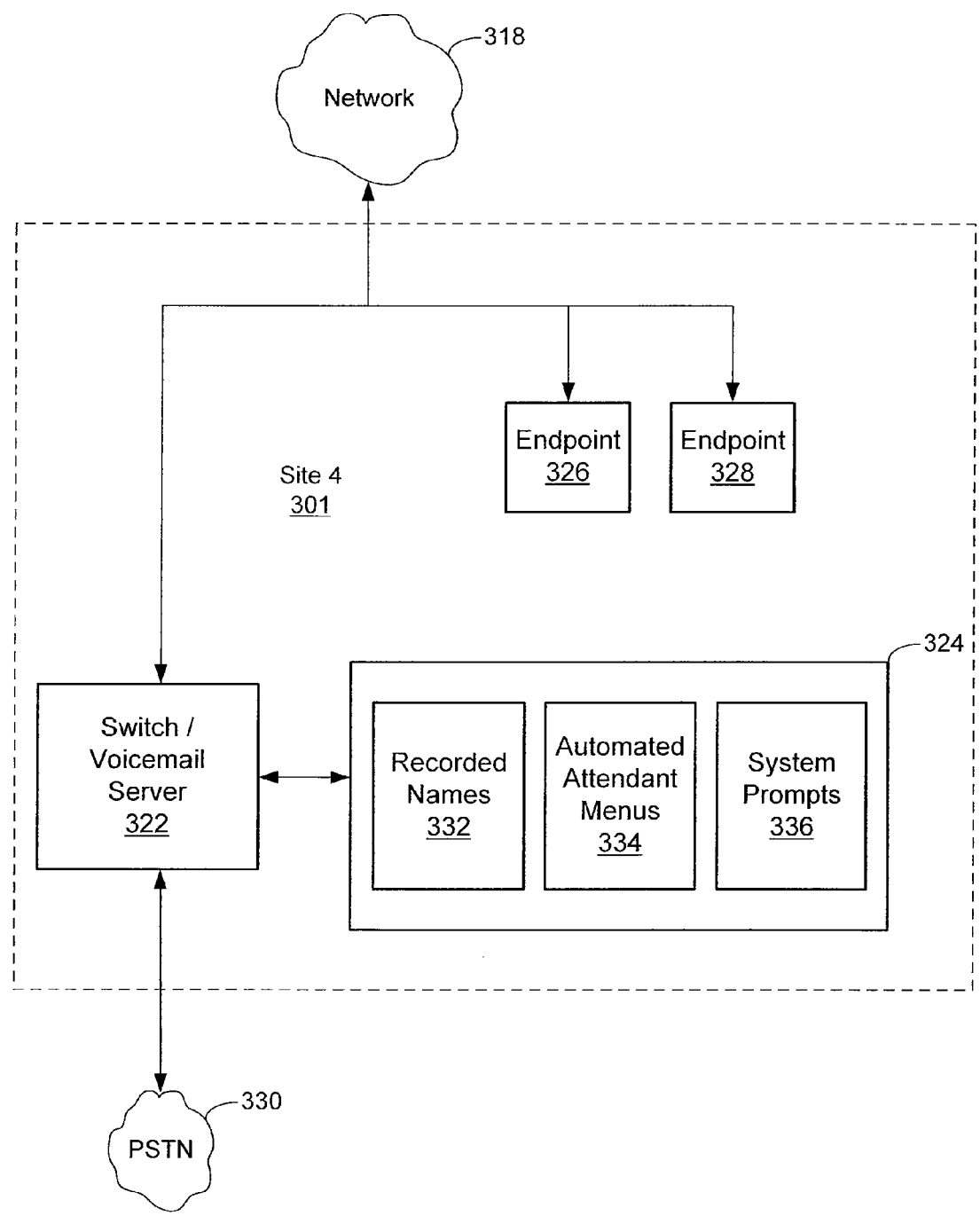
FIG. 3 shows a simplified block diagram of a switch/voicemail server that provides voicemail features to a plurality of communication devices in a distributed VoIP system, in accordance with another embodiment of the present invention.

Switch/voicemail server 122 typically includes familiar software and hardware components. For example, switch/voicemail server 122 may include an operating system, processor, local memory for storage, I/O devices, and a system bus interconnecting the components. RAM and disk drives are examples of local memory for storage of data and computer programs. Other types of local memory include magnetic storage media, optical storage media, flash memory, networked storage devices, and the like. In some embodiments, switch/voicemail server 122 may be linked to data storage (as shown in FIG. 3).

Figure 2:
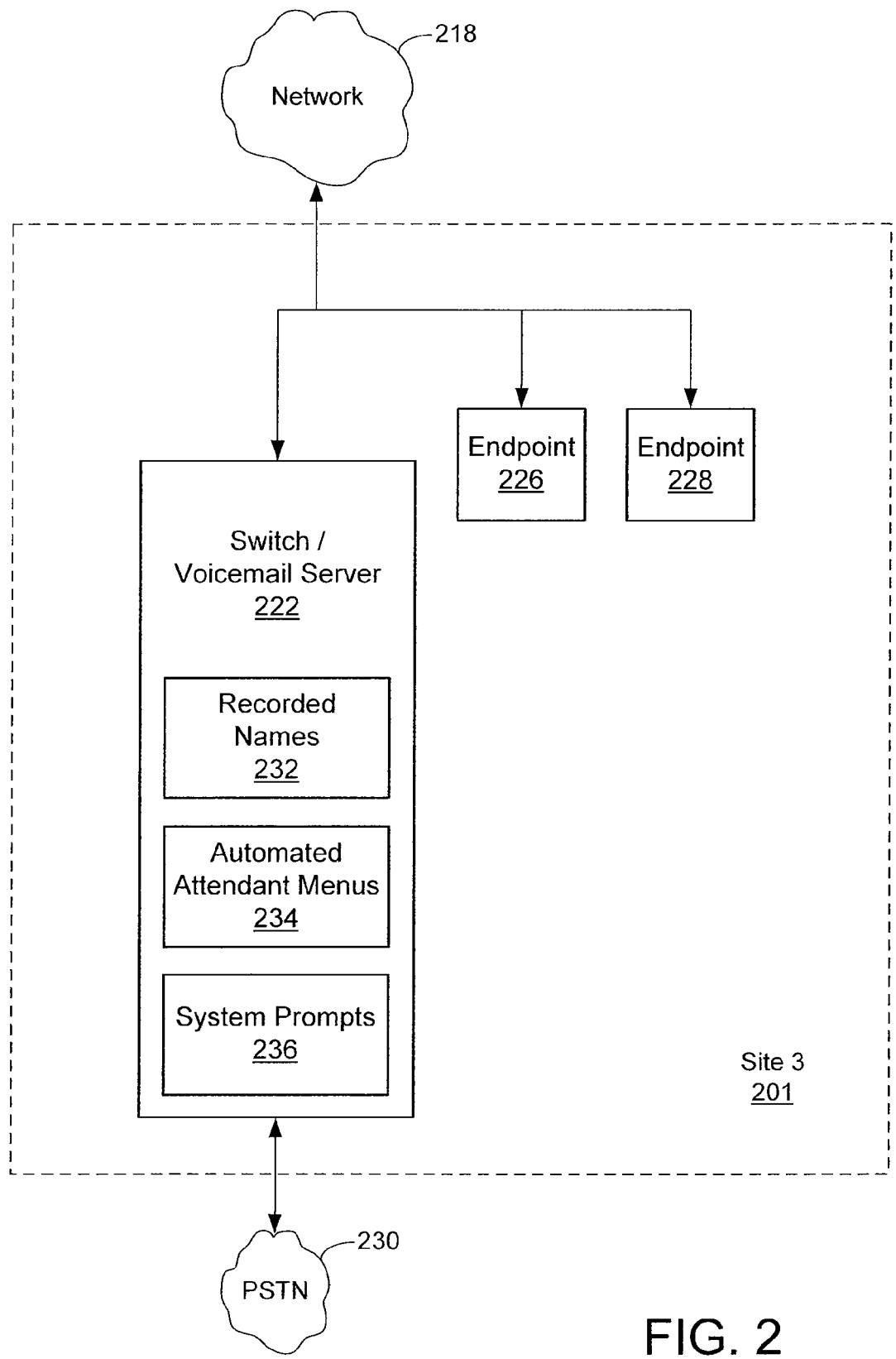
FIG. 2 shows a simplified block diagram of a switch/voicemail server that provides voicemail features to a plurality of communication devices in a distributed VoIP system, in accordance with an embodiment of the present invention.

FIG. 2 shows a simplified block diagram of a switch/voicemail server that provides voicemail features to a plurality of communication devices in a distributed VoIP system, in accordance with an embodiment of the present invention. FIG. 2 shows switch/voicemail server 222 linked to PSTN 230 in a manner similar to that described above with regard to switch/voicemail server 122 of FIG. 1. Endpoints 226, 228 are also linked to switch/voicemail server 222. The components at third site 201 are linked to network 218. One or more other groups of components at other sites may also be linked to network 218 in a manner similar to that shown in FIG. 1.

Switch/voicemail server 222 may be configured to perform some of the same functions as switch/voicemail server 122 of FIG. 1. For example, switch/voicemail server 222 may be configured to provide voicemail features to endpoints 226, 228. As shown in FIG. 2, switch/voicemail server 222 may store in local memory recorded names 232, automated attendant menus 234, and system prompts 236. In one embodiment, recorded names 232 may include only the recorded names of the users that are associated with endpoints 226, 228. In some embodiments, automated attendant menus 234 may include only those automated attendant menus that are configured for switch/voicemail server 222. The configured automated attendant menus may include those selected by an administrator of the VoIP system to be accessible to the users associated with endpoints 226, 228. In this embodiment, automated attendant menus 234 may be configured during initial system setup or at a later time. In some embodiments, system prompts 236 may include the system prompts in only a subset of the languages available on the voicemail server(s) in the distributed VoIP system. For example, a voicemail server may store system prompts in as many as fifteen or more different languages, whereas switch/voicemail server 222 may store system prompts in only a subset of those languages. As an example, the system prompts stored by switch/voicemail server 222 may be in four different languages even though they are stored in fifteen different languages on the voicemail servers in the system. In some embodiments, the languages stored by the switch/voicemail server may be selected by a system administrator. In other embodiments, the languages stored by switch/voicemail server 222 may be determined based on the language(s) associated with the users who have voicemail mailboxes on switch/voicemail server 222. In yet other embodiments, the languages may include a combination of those selected and those associated with the users.

In some embodiments the switch/voicemail server may be configured to automatically update the system prompts it stores. For example, if the switch/voicemail server provides voicemail features to a user who is associated with a particular language, and the system prompts in that particular language are not stored by the switch/voicemail server, the switch/voicemail server may retrieve the system prompts in that language from a voicemail server. Similarly, if there are no users associated with a particular language and there are system prompts associated with that language stored on the switch/voicemail server, the switch/voicemail server may remove the system prompts in that language from memory.

FIG. 3 shows a simplified block diagram of a switch/voicemail server that provides voicemail features to a plurality of communication devices in a distributed VoIP system, in accordance with another embodiment of the present invention. FIG. 3 shows switch/voicemail server 322 linked to PSTN 330, data storage 324, and endpoints 326, 328 in a manner similar to that described above with regard to switch/voicemail servers 122, 222. Network 318 may be linked to one or more other groups of VoIP components in a manner similar to that shown in FIG. 1.

As shown in FIG. 3, recorded names 332, automated attendant menus 334, and/or system prompts 336 may be stored in data storage 324, which is external to but accessible by switch/voicemail server 322. Data storage 324 may be configured to store and maintain voicemail messages and voicemail data for endpoints 326, 328. Data storage 324 may be any conventional database such as those powered by My SQL, Oracle, Sybase, and the like, or another data source such as an LDAP server.

Similar to the embodiment of FIG. 2, recorded names 332 may include only the recorded names of the users that are associated with endpoints 326, 328. In some embodiments, automated attendant menus 334 may include only those automated attendant menus that are configured for switch/voicemail server 322. Additionally, system prompts 336 may be stored in a subset of the languages available on the voicemail server(s) in the distributed VoIP system.

Figure 4:
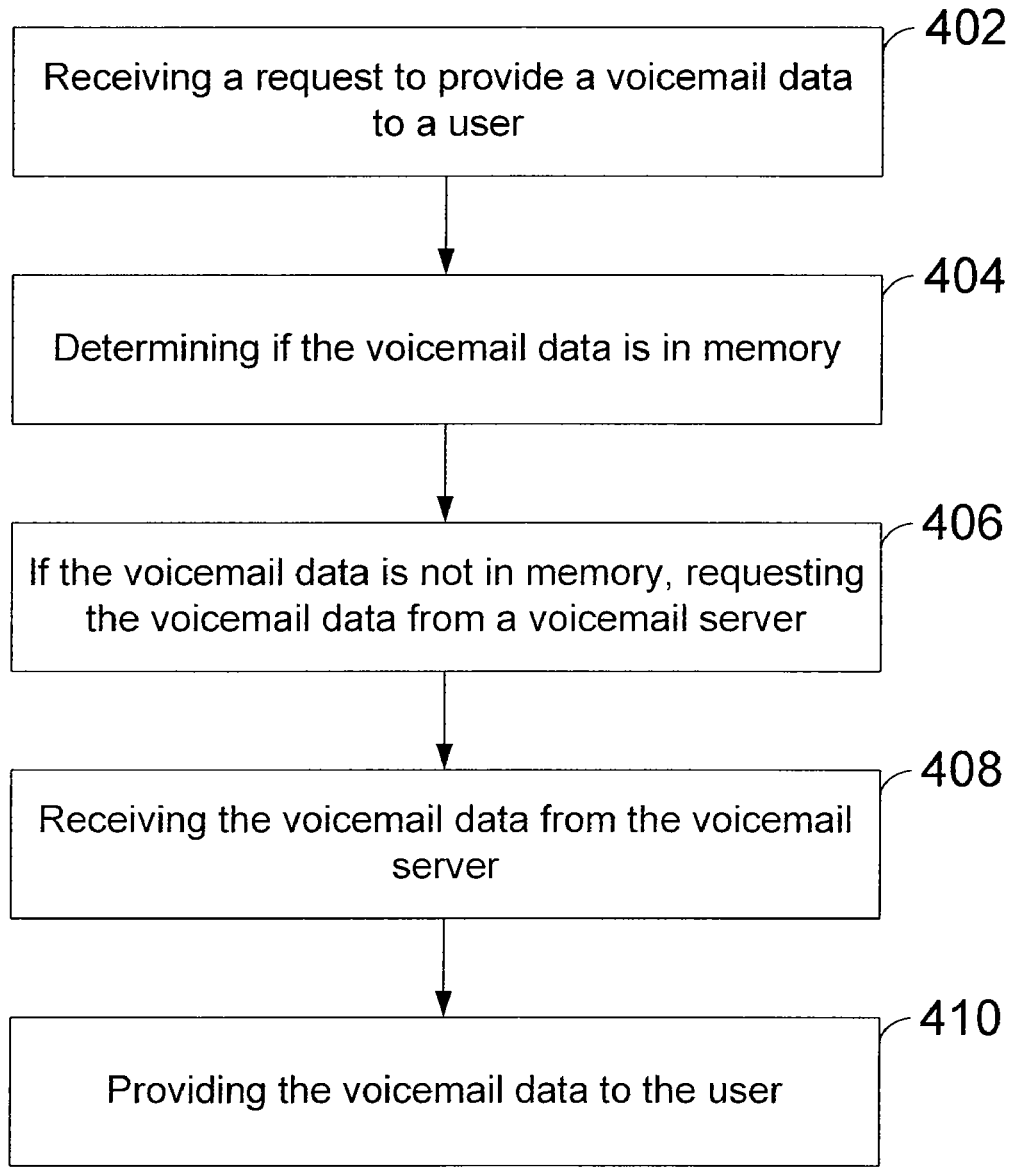
FIG. 4 is a simplified flowchart illustrating a method for providing voicemail data to a user in a distributed VoIP system, in accordance with an embodiment of the present invention.

FIG. 4 is a simplified flowchart illustrating a method for providing voicemail data to a user in a distributed VoIP system, in accordance with an embodiment of the present invention. It should be understood that the following flowchart provides a particular method, and other sequences and steps may be performed in accordance with other embodiments of the invention. For example, the steps outlined below may be performed in a different order. Moreover, the individual steps may include multiple sub-steps that may be performed in various sequences as appropriate. Additional steps may be added or steps may be removed depending on the particular application. Thus, the scope of the invention is not limited to this specific method.

In step 402 a request is received to provide voicemail data to a user. As an example, a request to play a recorded name may be generated when a user accesses a voicemail message, or when one user sends a message to another user. As other examples, a request to play a recorded name or greeting may be generated when a call goes to voicemail, or when a user requests a time stamp on a voice message. There are many other scenarios where a request for voicemail data may be generated, and the scope of the invention is not limited to the examples provided herein. The voicemail data may also include system prompts, automated attendant menus, work group greetings and prompts, music on hold files, video files, recorded conference call files, and other data. In one embodiment, the request may be received by a switch/voicemail server. Step 404 involves determining if the voicemail data is in memory. In some embodiments, the memory may be local memory. In other embodiments, the memory may be external data storage. In step 406, if the voicemail data is not in memory, the voicemail data is requested from a voicemail server. In some embodiments, each switch/voicemail server may be associated with a particular voicemail server for requesting voicemail data. In step 408 the voicemail data is received from the voicemail server. In step 410 the voicemail data is provided to the user.

In some embodiments, if the voicemail data is not received from the voicemail server within a period of time, an extension may be provided instead of the voicemail data. An extension is the phone number or extension of the communication device associated with the request. For example, when a user accesses a voicemail message, the integrated switch/voicemail server may play the recorded name of the person who left the message. However, if the switch/voicemail server does not have the recorded name in memory, and the recorded name is not provided by the voicemail server within a period of time, the extension of the person who left the message may be provided to the user. The period of time may be preset for the VoIP system, or it may be a period of time, for example two seconds, selected for the switch/voicemail server by a system administrator.

Figure 5:
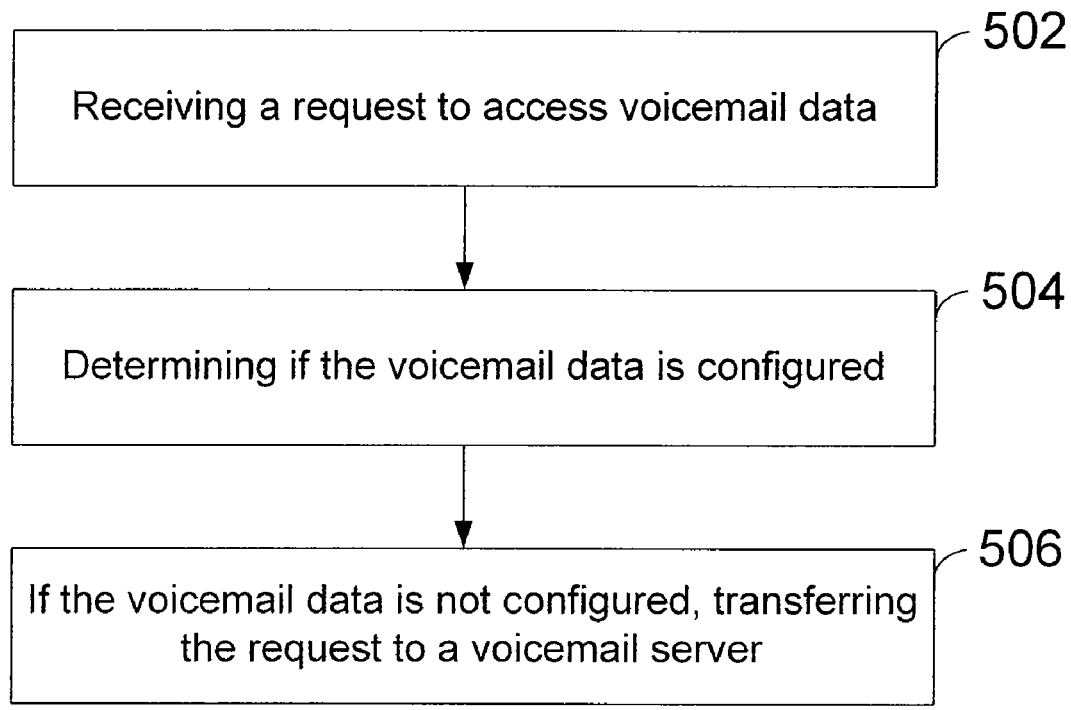
FIG. 5 is a simplified flowchart illustrating a method for providing voicemail data to a user in a distributed VoIP system, in accordance with another embodiment of the present invention.

FIG. 5 is a simplified flowchart illustrating a method for providing voicemail data to a user in a distributed VoIP system, in accordance with another embodiment of the present invention. As mentioned above with regard to FIG. 4, the scope of the present invention is not limited to this specific method. Other sequences, steps, and sub-steps may be performed, and/or additional steps may be added and/or removed in accordance with embodiments of the present invention.

In step 502 a request to access voicemail data is received. As an example, a request to access an automated attendant menu may be generated by a user who is accessing some of the features of the voicemail system. The request may be generated by a call to the voicemail system. The voicemail data may also include recorded names, system prompts, work group greetings and prompts, music on hold files, video files, recorded conference call files, and other data. In one embodiment, the request may be received by a switch/voicemail server. Step 504 involves determining if the voicemail data is configured for the switch/voicemail server. For example, a switch/voicemail server may store only the automated attendant menus that are configured for the switch/voicemail server. In step 506, if the voicemail data is not configured for the switch/voicemail server, the request is transferred to a voicemail server. In some embodiments each switch/voicemail server may be associated with a particular voicemail server for transferring requests for voicemail data. In one embodiment, the switch/voicemail server stores only the voicemail data that is configured for the switch/voicemail server, and the voicemail server stores the voicemail data configured for the VoIP system.

In some embodiments, the switch/voicemail server may provide system prompts in all of the languages provided by the voicemail servers using a method similar to that illustrated in FIG. 5. For example, if a request is received for a system prompt in a language that is not stored by the switch/voicemail server, the request may be transferred to a voicemail server.

In embodiments where the switch/voicemail server has less storage than a voicemail server, it may be useful to monitor the usage of the voicemail system. Accordingly, some embodiments of the invention provide systems and methods to monitor usage and administer storage limits of the voicemail features in the distributed VoIP system. For example, as shown in TABLE 1 below, data from each voicemail server and switch/voicemail server in a distributed VoIP system can be assembled and displayed. In one embodiment, an application collects the data from each server. The data may then be displayed on a terminal that is linked to one of the voicemail servers in the VoIP system. In the example shown in TABLE 1, the number of mailboxes, the number of messages, the total space used, and the free space are shown for each server in the system. This system includes a voicemail server and a switch/voicemail server. This example also shows when the last successful backup of the voice messages and voicemail data occurred for each server. "Null" is listed for the voicemail server because the voicemail server is backed up to data storage on a regular schedule. The date and time of the last successful backup to data storage is listed for the switch/voicemail server. Other embodiments may include more or fewer categories of data.

TABLE 1

| Voicemail Server | Mailboxes | Messages | Space Used (MB) | Free Space (MB) | Last Successful Backup |
|---|---|---|---|---|---|
| Voicemail Server | 100 | 200 | 120 | 20 | Null |
| Switch/Voicemail Server | 20 | 24 | 14 | 6 | 6/7/08 4:12:03 PM (GMT) |

In addition to the system level data, detailed data on each server can be assembled and displayed in some embodiments. For example, TABLE 2 below shows detailed data for a particular voicemail server or switch/voicemail server. This example shows the number of mailboxes and the number of voicemail messages. Also shown is the space used for voicemail messages, recorded names, automated attendant menus, and logs and other data. This example also includes the space used and the remaining free space. Other embodiments may include more or fewer categories of data.

TABLE 2

|  | Count | Space Used | (KB) |
|---|---|---|---|
| Mailboxes | 6 | Messages | 916 |
| Messages | 21 | Recorded Names | 32 |
|  |  | Automated Attendant Menus | 5 |
|  |  | Logs and Other Data | 18,141,040 |
|  |  | Free | 231,791,005 |
|  |  | Total | 249,932,998 |

As another example, TABLE 3 below shows detailed data for a particular server on a per-user basis. Here, the data includes each user's name, mailbox number, user group, and free space (far right column). Also included is the total number of messages in each user's mailbox, the number of unheard messages, and the allowed number of messages. Also included is the time in days since the user received the oldest message or saved a message and the allowed time limit. Also included is the time in days since the oldest message was listened to and the allowed time limit. In some embodiments, a system administrator may control usage of the system by altering the limits shown in TABLE 3. For example, if the free space on the server is low, the time allowed for saved or unheard messages can be reduced. In other embodiments, the data can be continuously monitored by each server and flags can be automatically generated and sent to an administrator according to known techniques. Many other uses of the data and methods for administering the usage limits would be apparent to one of ordinary skill in the art.

TABLE 3

| First Name | Last Name | User Mailbox | Group | Number of Messages | | | Saved/Unheard (Days) | | Heard (Days) | | Space Used (KB) |
|---|---|---|---|---|---|---|---|---|---|---|---|
| | | | | Total | Unheard | Allowed | Oldest | Allowed | Oldest | Allowed | |
| Joe | Smith | 101 | Group 1 | 18 | 0 | 60 | 16 | 30 | 12 | 90 | 806 |
| John | Doe | 102 | Group 1 | 3 | 2 | 60 | 9 | 30 | 9 | 90 | 110 |

The systems and methods for providing voicemail features in a distributed VoIP system according to embodiments of the present invention enjoy, among other advantages, distributed VoIP features such as reduced network delay (an integrated switch/voicemail server can be located geographically close to users at smaller remote sites), reduced system resources (an integrated switch/voicemail server can include fewer resources than separate switch, server, and storage components), reduced upfront and maintenance costs (reduced resources can have lower upfront and maintenance costs), system-wide knowledge (a switch/voicemail server can request voicemail data from voicemail servers), a smaller footprint (footprint of integrated switch/voicemail server can be reduced compared to separate switch, server, and storage components), and the ability to easily monitor system usage and administer storage limits.

It is to be understood that the systems shown in FIGS. 1-3 are presented merely as exemplary systems to illustrate some of the features and functionality of the present invention. Not all distributed VoIP systems include the components shown in these figures. Likewise, some distributed VoIP systems include additional components that are not shown. Distributed VoIP systems may include numerous configurations. For example, in some configurations the components shown in FIGS. 1-3 may be combined and/or provide functionality that is different from that described herein. Thus, the present invention can be embodied in many different forms and should not be construed as limited to the embodiments set forth herein.

In FIGS. 1-3 the communication links between the various components are shown using arrows. These communication links may represent wired or wireless connections. For example, FIG. 1 shows endpoints 110, 112, 114 linked with voicemail server 106. These links may be wired, wireless, or a combination of wired and wireless technologies.

While the present invention has been described in terms of specific embodiments, it should be apparent to those skilled in the art that the scope of the present invention is not limited to the embodiments described herein. For example, the features of one or more embodiments of the invention may be combined with one or more features of other embodiments without departing from the scope of the invention. The specification and drawings are, accordingly, to be regarded in an illustrative rather than a restrictive sense. The scope of the present invention should be determined not with reference to the above description, but should be determined with reference to the appended claims along with their full scope of equivalents.

What is claimed is:

1. A distributed VoIP system, comprising:
    a first switch coupled to a network and configured to provide voicemail features to a first group of one or more users, the first switch also configured to manage communications of communication devices associated with the first group of one or more users;
    a voicemail server coupled to the network, the voicemail server configured to provide voicemail features to a second group of one or more users; and
    a second switch coupled to the network and coupled to the voicemail server, the second switch configured to manage communications of communication devices associated with the second group of one or more users, wherein the first switch is configured to store voicemail data associated with only the first group, and the voicemail server is configured to store the voicemail data associated with both the first group and the second group.

2. The distributed VoIP system of claim 1 wherein the voicemail data includes recorded names.

3. The distributed VoIP system of claim 1 wherein the first switch is an integrated switch/voicemail server.

4. The distributed VoIP system of claim 1 wherein the voicemail server is separate from the second switch.

5. The distributed VoIP system of claim 1 wherein the first switch is configured to store the voicemail data associated with the first group in local memory of the first switch.

6. The distributed VoIP system of claim 5 wherein the local memory includes flash memory.

7. The distributed VoIP system of claim 1 further comprising:
    data storage coupled to the voicemail server, wherein the voicemail server is configured to store the voicemail data associated with both the first group and the second group in the data storage.

8. The distributed VoIP system of claim 7 wherein the data storage is separate from the voicemail server.

9. The distributed VoIP system of claim 1 further comprising:
    a terminal coupled to the voicemail server, wherein the terminal is configured to display usage of the voicemail features by the distributed VoIP system.

10. The distributed VoIP system of claim 9 wherein the terminal is configured to display the usage of the voicemail features by the first switch and by the voicemail server.

11. The distributed VoIP system of claim 10 wherein the terminal is configured to display the usage of the voicemail features by the one or more users in the first group and the one or more users in the second group.

12. The distributed VoIP system of claim 1 wherein the first switch is configured to store system prompts only in languages associated with the one or more users in the first group.

13. The distributed VoIP system of claim 12 wherein if a user in the first group is associated with a language and the system prompts in the language are not stored in memory of the first switch, the first switch is configured to retrieve the system prompts in the language from the voicemail server.

14. The distributed VoIP system of claim 12 wherein if the first switch has the system prompts in memory in a language that is not associated with a user in the first group, the first switch is configured to remove the system prompts in the language from the memory.

15. The distributed VoIP system of claim 1 wherein system prompts stored in memory of the first switch are selected by a system administrator.

16. A method for providing voicemail data to a first user in a distributed VoIP system, the distributed VoIP system including (i) a voicemail server and (ii) an integrated switch/voicemail server, the method comprising:
   (a) receiving a request at the integrated switch/voicemail server to provide the voicemail data to the first user, the voicemail data being associated with a second user, the first user being part of a first group of one or more users and the second user being part of a second group of one or more users, the integrated switch/voicemail server configured to provide voicemail features to the first group of one or more users and also configured to manage communications of communication devices associated with the first group of one or more users;
   (b) determining if the voicemail data is in memory of the integrated switch/voicemail server; and
   (c) if the voicemail data is not in the memory, requesting the voicemail data from the voicemail server, the voicemail server configured to provide voicemail features to the second group of one or more users, wherein the integrated switch/voicemail server is configured to store voicemail data associated with only the first group, and the voicemail server is configured to store voicemail data associated with both the first group and the second group.

17. The method of claim 16 further comprising:
   (d) receiving the voicemail data from the voicemail server; and
   (e) providing the voicemail data to the first user.

18. The method of claim 16 wherein the memory is local memory.

19. The method of claim 18 wherein the local memory includes flash memory.

20. The method of claim 16 further comprising:
   (d) waiting a period of time; and
   (e) if the voicemail data is not received from the voicemail server within the period of time, providing an extension associated with the second user to the first user.

21. The method of claim 20 wherein the voicemail data includes a recorded name of the second user.

22. A distributed VoIP system, comprising:
   a first switch coupled to a network and configured to provide voicemail features to a first group of one or more users, the first switch also configured to manage communications of communication devices associated with the first group of one or more users;
   a voicemail server coupled to the network, the voicemail server configured to provide voicemail features to a second group of one or more users; and
   a second switch coupled to the network and coupled to the voicemail server, the second switch configured to manage communications of communication devices associated with the second group of one or more users, wherein the first switch is configured to store voicemail data configured for only the first switch, and the voicemail server is configured to store the voicemail data configured for the VoIP system.

23. The distributed VoIP system of claim 22 wherein the voicemail data includes automated attendant menus.

24. The distributed VoIP system of claim 22 wherein the first switch is an integrated switch/voicemail server.

25. The distributed VoIP system of claim 22 wherein the first switch is configured to store the voicemail data in local memory of the first switch.

26. The distributed VoIP system of claim 25 wherein the memory includes flash memory.

27. The distributed VoIP system of claim 22 wherein the first switch is configured to store system prompts only in languages associated with the one or more users in the first group.

28. The distributed VoIP system of claim 27 wherein if a user in the first group is associated with a language and the system prompts in the language are not stored in memory of the first switch, the first switch is configured to retrieve the system prompts in the language from the voicemail server.

29. The distributed VoIP system of claim 27 wherein if the first switch has the system prompts in memory in a language that is not associated with a user in the first group, the first switch is configured to remove the system prompts in the language from the memory.

30. The distributed VoIP system of claim 22 wherein system prompts stored in memory of the first switch are selected by a system administrator.

31. A method for providing voicemail data to a user in a first group of one or more users in a distributed VoIP system, the method comprising:
   (a) receiving a request at a first switch to access the voicemail data, the first switch configured to provide voicemail features to the first group of one or more users and also configured to manage communications of communication devices associated with the first group of one or more users;
   (b) determining if the voicemail data is configured for the first switch; and
   (c) if the voicemail data is not configured for the first switch, transferring the request to a voicemail server, the voicemail server configured to provide voicemail features to a second group of one or more users, wherein the first switch includes only the voicemail data configured for the first group, and the voicemail server includes the voicemail data configured for both the first group and the second group.

32. The method of claim 31 wherein the first switch is an integrated switch/voicemail server.

33. The method of claim 31 wherein the voicemail data includes automated attendant menus.

34. The method of claim 31 wherein the request is generated by a call.

35. The distributed VoIP system of claim 1 wherein the communication devices associated with the first group of one or more users and the communication devices associated with the second group of one or more users each include at least one of an IP phone, a soft phone, an analog phone, or a button box.

36. The method of claim 16 wherein the communication devices associated with the first group of one or more users include at least one of an IP phone, a soft phone, an analog phone, or a button box.

37. The distributed VoIP system of claim 22 wherein the communication devices associated with the first group of one or more users and the communication devices associated with the second group of one or more users each include at least one of an IP phone, a soft phone, an analog phone, or a button box.

38. The method of claim 31 wherein the communication devices associated with the first group of one or more users include at least one of an IP phone, a soft phone, an analog phone, or a button box.

* * * * *